United States Patent [19]

Leikauf

[11] Patent Number: 5,968,256
[45] Date of Patent: Oct. 19, 1999

[54] CEMENT ACCELERATING ADMIXTURE

[75] Inventor: Bernhard Leikauf, Linn, Switzerland

[73] Assignee: MBT Holding AG, Zurich, Switzerland

[21] Appl. No.: 08/765,714

[22] PCT Filed: Aug. 7, 1995

[86] PCT No.: PCT/EP95/03132

§ 371 Date: Apr. 29, 1997

§ 102(e) Date: Apr. 29, 1997

[87] PCT Pub. No.: WO96/05150

PCT Pub. Date: Feb. 22, 1996

[30] Foreign Application Priority Data

Aug. 10, 1994 [GB] United Kingdom .................. 9416114

[51] Int. Cl.$^6$ .................................................. C04B 24/12
[52] U.S. Cl. ......................... 106/727; 106/808; 106/819; 106/823; 524/2; 524/5
[58] Field of Search ..................................... 106/696, 724, 106/727, 808, 819, 823; 524/2, 5

[56] References Cited

U.S. PATENT DOCUMENTS 5,560,774  10/1996  Burge et al. ............................. 106/692

FOREIGN PATENT DOCUMENTS

| 19625853 | 1/1997 | Germany . |
| 402202504 | 8/1990 | Japan . |
| 404173727 | 6/1992 | Japan . |
| 406256626 | 9/1994 | Japan . |
| 409059351 | 3/1997 | Japan . |

*Primary Examiner*—Paul Marcantoni
*Attorney, Agent, or Firm*—Fish & Richardson P.C.

[57] ABSTRACT

An accelerating admixture for use with sprayable cementitious compositions such as shotcrete comprises a mixture of (a) amorphous aluminium hydroxide and/or aluminium hydroxysulphate, and (b) at least one amine, preferably an alkanolamine. In a preferred embodiment, the admixture also comprises an aqueous dispersion of at least one polymer which comprises pendant carboxylic moieties.

18 Claims, No Drawings

CEMENT ACCELERATING ADMIXTURE

This invention relates to cementitious spraying compositions and to admixtures for use therein.

Cementitious compositions for application to a substrate by spraying, for example, "shotcrete", must be capable of being sprayed in the first place (that is, they must retain sufficient fluidity), and on contacting the surface, they must set quickly (generally within a few minutes) to give a stiff layer to which further layers may quickly be applied. The art-recognised way of achieving this has been the addition at the point of spraying (for example, by injecting into a spray nozzle) of an accelerator in the form of an aqueous solution. The accelerators used are generally strong alkalis such as sodium aluminate, sodium or potassium hydroxide or carbonate and triethanolamine (see, for example, "Concrete Admixtures Handbook", ed. Ramachandran (Noyes, 1984)).

The nature of such substances makes for unpleasant working conditions on spraying sites, and there has long been a need for an effective spraying accelerator which has less of the caustic character of the known accelerators. In a recent development, accelerators comprising amorphous aluminium hydroxide have been proposed. These have the advantage of low alkalinity and high performance. Typical examples of accelerators have been blends of amorphous aluminium hydroxide with gypsum or various water-soluble salts.

Accelerators applied at the nozzle are in liquid form. This means that, in the case of aluminium hydroxide, the solid accelerator must be dispersed in water. This can be done on site, but it is much more convenient if such an accelerator can be supplied in liquid form. This has hitherto not been possible with aluminium hydroxide, dispersions of which are not storage-stable for more than a few days.

It has now been found that a particular combination of aluminium hydroxide with another material not only has excellent storage stability but also is particularly effective as an accelerator for spraying cementitious compositions. There is therefore provided, according to the present invention, an accelerating admixture for use in the spraying of cementitious compositions, comprising (a) amorphous aluminium hydroxide and/or aluminium hydroxysulphate, and (b) at least one amine.

There is additionally provided a method of preparing a storage-stable, amorphous aluminium hydroxide and/or aluminium hydroxysulphate-based accelerating admixture by the dispersion of amorphous aluminium hydroxide and/or aluminium hydroxysulphate in water, there being additionally added at least one amine.

In the particular circumstances of this invention, aluminium hydroxysulphate is often a better accelerator than aluminium hydroxide and is therefore preferred. It is possible to use a mixture of aluminium hydroxysulphate with aluminium hydroxide and/or aluminium sulphate, but it is preferable to use the hydroxysulphate alone. A typical commercially-available aluminium hydroxysulphate is "Gecedral" (trade mark) L (ex Guilini Chemie GmbH, Ludwigshafen/Rhein, Germany).

The amines for use in this invention should be liquid or soluble in water. A highly preferred class of amines is that of the alkanolamines. The preferred alkanolamines are dialkanolamines and trialkanolamines, more preferably diethanolamine and triethanolamine. Most preferred is a mixture of diethanolamine and triethanolamine.

In an admixture according to the invention, the aluminium hydroxide and/or hydroxysulphate is combined with the alkanolamine in the weight ratio of from 1:10–1000:1, preferably from 1:0–100:1, more preferably from 1:1–0:1. When the preferred mixture of diethanolamine and triethanolamine is used, the ratio of diethanolamine to triethanolamine is from 1:1 to 0:1.

The constituents of the admixture may be added to a spray nozzle separately or preferably as a pre-mixed blend. The invention therefore also provides an accelerating admixture which is a mixture of the aforementioned constituents. In either case the weight ratio of the constituent on cement is from 0.5–10% for the aluminium hydroxide/hydroxysulphate and from 0.001 to 5%, more preferably from 0.001–2% or 0.01–5% for the amine.

In an especially preferred embodiment of the invention, the accelerating admixture of the invention may be combined with certain other materials to provide particularly outstanding results. The invention therefore also provides a spraying admixture which comprises a combination of an accelerating admixture as hereinabove defined and an aqueous dispersion of at least one polymer which comprises pendant carboxylic moieties.

The polymers useful in this aspect of the invention are any polymers which bear suitable pendant carboxylic moieties. The carboxylic moiety may be a carboxyl group, and any polymer having such groups and complying with the other parameters hereinunder described will work in this invention. Examples include poly(acrylic) and poly(methacrylic) acids and mixtures thereof and copolymers of (meth)acrylic acid with other comonomers. However, preferred polymers are of the "comb" type, that is, polymers comprising a polymer backbone (whose chemical nature is irrelevant to the working of the invention) with carboxyl group-containing moieties pendant therefrom. The moieties may be up to 100 units long and may comprise monomer residues of, for example (meth)acrylic acid, maleic acid or fumaric acid. It is preferred that the moieties be completely made up of (meth)acrylic acid residues.

A preferred backbone is a random addition polymer, one of the monomers of which comprised, prior to polymerization, more than one, and preferably two, polymerizable double bonds. A preferred monomer with more than one double bond is butadiene and a preferred copolymer is a styrene-butadiene copolymer. To such a copolymer (which may have pendant and/or in-chain polymerizable double bonds) carboxyl group-containing monomers such as acrylic acid, methacrylic acid, maleic acid or fumaric acid may be graft copolymerized. Examples of preferred copolymers are styrene-butadiene copolymerized with acrylic acid and styrene/butadiene/maleic (or fumaric) acid terpolymer.

The polymers of this invention have molecular weights (weight average) in excess of 20,000 and are solids at room temperature. They also have a limited solubility in water, being at best dispersible (never completely soluble), but they are highly soluble in alkaline media (such as a fluid cementitious mix). In the case of poly(meth)acrylic acid and polymers which are inherently soluble in water, it is possible to prepare such polymers in such a form that the necessary solubility is achieved, for example, particulate form. They are added to the cementitious mix as an aqueous dispersion of less than 5% solids by weight.

Typical examples of suitable commercial materials are those available under the trade mark "Synthomer" (ex Synthomer Chemie GmbH, Frankfurt/Main, Germany). An especially suitable example is "Synthomer" 9523 (a methacrylic acid-styrene-butadiene copolymer). Another suitable commercial product is "Polyacryl" AD (ex Polygon Chemie AG, Olten, Switzerland)

The aqueous dispersion is added to the cementitious composition at the nozzle, either separately from or in a mixture with the acceleratiing admixture hereinabove described. The proportion of polymer present is from 0.01 to 3% by weight on cement.

When the spraying admixture comprises an aqueous polymer dispersion as hereinabove described, the admixture must be acid, preferably with a pH of 6 maximum. This may be achieved by the addition of an acid, which may be chosen from any suitable strong organic or inorganic acid, which is added in sufficient quantity to achieve the desired pH. In addition, the acid must not react adversely with any of the components of the cementitious composition or the admixture to an unacceptable degree. Reactivity will vary, depending on the individual acid and the components present, but the selection of a suitable acid is not a problem for the skilled person. It is preferred to use a strong mineral acid, and nitric acid has been found to work particularly well in most circumstances.

It has been found that the use of an aqueous polymer dispersion as hereinabove defined in conjunction with an accelerating admixture as hereinabove described enhances the performance of a sprayed cementitious composition considerably. In particular, it appears to enhance adhesion of the sprayed composition to the substrate in the important few minutes after spraying when the hardening of the composition is not sufficiently advanced to ensure good adhesion.

A preferred spraying admixture has the following composition (dry contents, by weight, the remainder of the formulation to 100% being water):

| | |
|---|---|
| aluminium hydroxide/hydroxysulphate | 20%–60% |
| alkanolamine | 0.01%–25% |
| polymer dispersion | 0%–20% |
| acid | 1%–20% |

A particularly preferred composition has the composition (dry contents, by weight, the remainder of the formulation to 100% being water)

| | |
|---|---|
| aluminium hydroxysulphate | 40%–60% |
| triethanolamine | 0.01%–20% |
| diethanolamine | 0%–5% |
| acrylic copolymer dispersion | 10%–20% |
| nitric acid | 5%–20% |

The compositions and processes of this invention are useful in the spraying of cementitious composition by both the "wet" and "dry" methods, but they work better in the "wet" method where water is added at the mixing stage prior to pumping. The invention therefore provides a sprayable cementitious composition which comprises an admixture as hereinabove defined.

The sprayable compositions according to this invention may also comprise any of the wide range of other admixtures known to be useful in sprayable cementitious compositions, used in art-recognised quantities. One particularly useful category of admixture is that of the plasticisers and superplasticisers; these can assist in the achievement of a desirable water/cement (W/C) ratio. A further class of useful admixtures are set retarders. Any of the known types may be used, a particularly useful class of materials being phosphonic acid-based materials, in particular those described in U.S. Pat. No. 4,964,917

A particular feature of the invention is the excellent storage stability of the admixtures according to the invention. If aluminium hydroxide and/or aluminium hydroxysulphate is dispersed in water, the viscosity rises rapidly to a value which renders the mixture unusable very quickly (typically LVT Brookfield viscosity 100,000+ mPas (Spindle No.4 at 1.5 rpm) a few days after mixing and completely solid after one week). In contrast, an admixture according to the-present invention stored at 20° C. remains usable for 6 months. Thus, it is possible to prepare admixtures well in advance of use and have them immediately ready, thus reducing the need to mix on site.

Sprayable cementitious compositions which utilize this invention form thick layers which "set up" quickly and can be resprayed without any problems. Rebound characteristics are particularly good, as are both strength development and long term strength. The invention therefore provides the use of a mixture of aluminium hydroxide and/or hydroxysulphate and at least one amine as an accelerating admixture for cementitious compositions which are to be sprayed. The invention further provides a method for the spraying of a cementitious composition on to a substrate from a spray nozzle, wherein there is added to the composition at the nozzle an accelerating admixture as hereinabove defined.

The invention is further described with reference to the following examples in which all parts are expressed by weight.

(a) Preparation of spraying admixture

The following materials are blended under low shear to form a homogeneous mixture:

| | |
|---|---|
| water | 55 parts |
| aluminium hydroxysulphate[1] | 17.9 |
| triethanolamine | 7.7 |
| diethanolamine | 1.55 |
| 65% nitric acid | 7.7 |
| aqueous polymer dispersion[2] | 6.15 |

[1]"Gecedral" L ex Guilini Chemie
[2]"Synthomer" 9523 ex Trüb Chemie (b) Testing of spraying admixture (i) A spraying concrete mixture is prepared with a W/C ratio of about 0.45. The mixture is sprayed on to a substrate through a nozzle with a dosing at the nozzle with the spraying admixture of 4.8% by weight on cement. It is found that the sprayed concrete goes matt immediately (signifying immediate setting) and that a layer of thickness in excess of 25 cm. can quickly be built up with very little rebound. A measurable strength develops after only 6 minutes, and after 16 hours the strength (measured at a number of different points) is between 7 and 18.8 N/mm$^2$.

(ii) The procedure of (i) above is repeated with a dosing of 3.8%. In this case, the thickness readily achievable is about 20 cm. and early strength development becomes measurable after about 20 min. After 16 hours, strength is measured and found to be between 14.7 and 19.6 N/mm$^2$.

I claim:

1. An accelerating admixture for use in the spraying of cementitious compositions, comprising an additive selected from the group consisting of (a) amorphous aluminum hydroxide, aluminum hydroxysulphate, or mixtures thereof and (b) at least one amine.

2. An accelerating admixture according to claim 1, wherein the constituents (a) and (b) are components of a single mixture.

3. An accelerating admixture according to claim 1, wherein aluminum hydroxysulphate is used and aluminum hydroxide is excluded.

4. An accelerating admixture according to claim 2, wherein aluminum hydroxysulfate is used and aluminum hydroxide is excluded.

5. An accelerating admixture according to claim 1, wherein the amine is an alkanolamine, said amorphous aluminum hydroxide, aluminum hydroxysulphate, or mixtures thereof are combined with the alkanolamine in the weight ratio of 1:10 to 1000:1.

6. An accelerating admixture according to claim 2, wherein the amine is an alkanolamine, said amorphous aluminum hydroxide, aluminum hydroxysulphate, or mixtures thereof are combined with the alkanolamine in the weight ratio of 1:10 to 1000:1.

7. An accelerating admixture according to claim 3, wherein the amine is an alkanolamine, said amorphous aluminum hydroxide, aluminum hydroxysulphate, or mixtures thereof are combined with the alkanolamine in the weight ratio of 1:10 to 1000:1.

8. An accelerating admixture according to claim 4, wherein the amine is an alkanolamine, said amorphous aluminum hydroxide, aluminum hydroxysulphate, or mixtures thereof are combined with the alkanolamine in the weight ratio of 1:10 to 1000:1.

9. An accelerating admixture according to claim 5 wherein the alkanolamine is selected from the group consisting of dialkanolamine and trialkanolamine.

10. An accelerating admixture according to claim 5, wherein the alkanolamine is selected from the group consisting of diethanolamine, triethanolamine, or mixtures thereof.

11. An accelerating admixture according to claim 1, wherein the admixture additionally comprises an aqueous dispersion of at least one polymer containing pendant carboxylic moieties.

12. An accelerating admixture according to claim 2, wherein the admixture additionally comprises an aqueous dispersion of at least one polymer containing pendant carboxylic moieties.

13. An accelerating admixture according to claim 3, wherein the admixture additionally comprises an aqueous dispersion of at least one polymer containing pendant carboxylic moieties.

14. An accelerating admixture according to claim 4, wherein the admixture additionally comprises an aqueous dispersion of at least one polymer containing pendant carboxylic moieties.

15. An accelerating admixture according to any one of claims 11–14, wherein the polymer containing pendant carboxylic moieties is a comb-polymer.

16. A sprayable cement composition which comprises the admixture according to any one of claims 1–14, wherein the amorphous aluminum hydroxide, aluminum hydroxysulfate, or mixtures thereof component is present in the amounts of 0.5 to 10% and the amine component is present in the amounts of 0.001 to 5%.

17. A sprayable cement composition which comprises the admixture according to any one of claims 1–14, wherein the amorphous aluminum hydroxide, aluminum hydroxysulfate, or mixtures thereof component is present in the amounts of 0.5 to 10% and the amine component is present in the amounts of 0.001 to 5%, said admixture further comprises an aqueous dispersion of a comb-polymer.

18. A spraying admixture in dry contents by weight, water to 100%, comprising:

| | |
|---|---|
| aluminium hydroxide/hydroxysulphate | 20%–60% |
| alkanolamine | 0.01%–25% |
| polymer dispersion | 0%–10% |
| acid | 1%–20%. |

* * * * *